Jan. 25, 1966  R. M. WHITE  3,231,779
ELASTIC WAVE RESPONSIVE APPARATUS
Filed June 25, 1962  3 Sheets-Sheet 1

INVENTOR.
RICHARD M. WHITE
BY
ATTORNEY

Jan. 25, 1966 R. M. WHITE 3,231,779
ELASTIC WAVE RESPONSIVE APPARATUS
Filed June 25, 1962 3 Sheets-Sheet 2
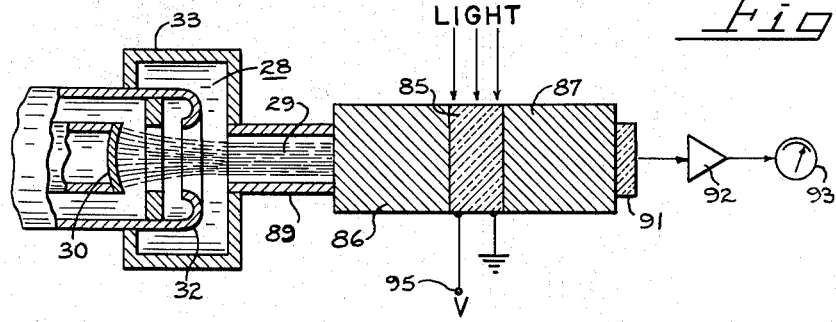
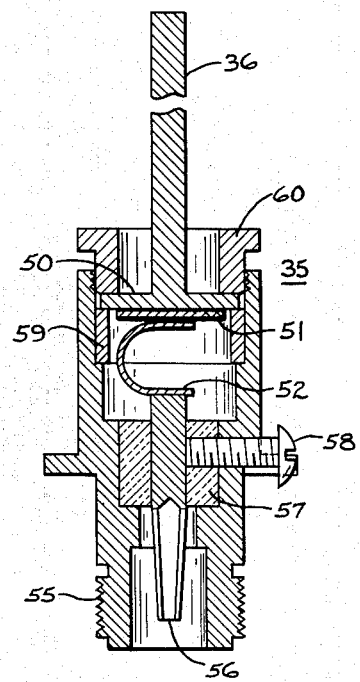
INVENTOR.
RICHARD M. WHITE
BY
ATTORNEY Jan. 25, 1966    R. M. WHITE    3,231,779
ELASTIC WAVE RESPONSIVE APPARATUS
Filed June 25, 1962    3 Sheets-Sheet 3
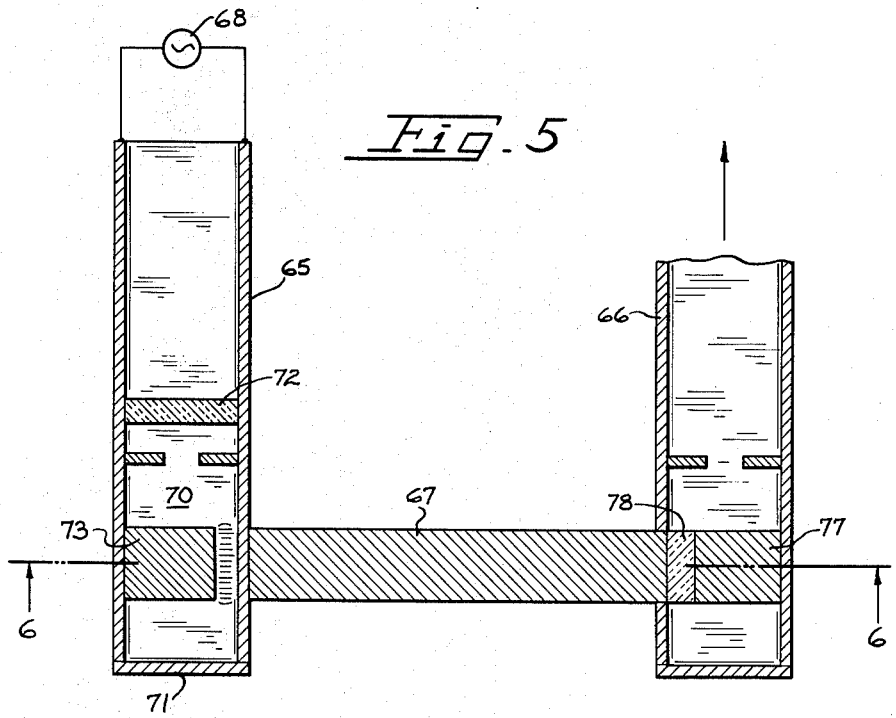
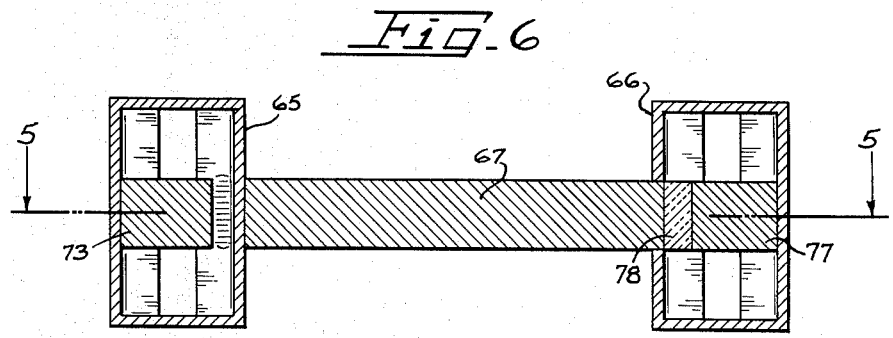
INVENTOR.
RICHARD M. WHITE
BY
ATTORNEY

United States Patent Office 3,231,779
Patented Jan. 25, 1966

3,231,779
ELASTIC WAVE RESPONSIVE APPARATUS
Richard M. White, Palo Alto, Calif., assignor to General Electric Company, a corporation of New York
Filed June 25, 1962, Ser. No. 204,880
16 Claims. (Cl. 315—4)

This invention relates to the generation, transmission, and reception of elastic waves and, more particularly, to the generation of elastic waves by atomic-sized and sub-atomic particles; the transmission of such waves; and the subsequent detection and measurement of the waves.

An elastic wave, sometimes known as a mechanical wave, may be defined as a mechanical vibration in an elastic medium, which results in a change in the volume, density, pressure or some other property of the medium. An elastic wave may also be considered to be the progression of stresses and strains along a particular path in a medium, such as a solid or a liquid. One form of an elastic wave is the acoustic wave, a wave audible to the human ear.

Heretofore, in apparatus employing elastic waves, the waves have been generated by mechanical sources, or by electrical sources employing magnetostrictive and piezoelectric conversion apparatus. For example, elastic waves are generated by an alternating electric signal applied across a piezoelectric crystal, which provides corresponding deformations of the crystal. By elastically coupling the crystal to an elastic medium the deformations induce elastic waves to propagate in the medium. An electrically excited piezoelectric crystal affixed to one end of a quartz rod induces the propagation of elastic waves along the length of the rod. A piezoelectric crystal affixed to the other end of the rod converts the elastic waves received at that end to corresponding electrical signals. Thus, the electrical signals applied to the input piezoelectric crystal are temporarily stored in the quartz rod in the form of the stresses and strains propagating therealong and comprising the elastic waves. Such a device may be used for information storage or as a signal delay apparatus. In a similar manner, an electrically excited piezoelectric crystal immersed in one end of a long tube of mercury induces the propagation of elastic waves in the mercury along the length of the tube.

The above described apparatus for converting electrical signals to elastic wave energy is often relatively inefficient and has relatively low upper frequency of operation. Accordingly, it is desirable to provide a more efficient method and apparatus for generating elastic waves and to provide a method and apparatus for generating elastic waves having higher frequencies.

Therefore, it is the principal object of this invention to provide improved apparatus for generating elastic waves.

Another object of this invention is to provide an improved method for generating elastic waves.

Another object of this invention is to provide improved apparatus for the generation, transmission, and reception of elastic waves.

Another object of this invention is to provide improved apparatus for the storage of information in the form of elastic waves.

Another object of this invention is to provide improved apparatus for the delay of signals in the form of elastic waves.

The foregoing objects are achieved, according to the instant invention, by generating elastic waves employing the incidence of atomic-sized or sub-atomic particles on the surface of an elastic member and by providing for the subsequent reception of the resulting elastic waves by a detector of elastic waves. Atomic-sized particles which may be employed include molecules and atoms. Sub-atomic particles which may be used include protons, neutrons, and electrons. According to one embodiment of the invention, an electron gun is disposed within an evacuated envelope. The electron stream produced by the electron gun is directed to be incident on the surface of an elastic member provided within the envelope. Elastic waves are thereby induced in the member and travel along a selected path in the member. The path length for the propagation of the elastic waves may be as long as desired. A detector of elastic waves is coupled to a selected location on the member. This detector comprises a piezoelectric crystal for converting elastic waves received to electric signals. Thus, elastic waves are generated, transmitted, and received in a high efficient and novel manner; this generation, transmission, and reception occurring over a greater frequency range than heretofore attainable.

In the above-described embodiment of the instant invention, various electrodes may be mounted within the evacuated envelope and proximate to the electron stream. In traveling along its path in the evacuated envelope the electron stream may intentionally or inadvertently strike one of the electrodes. Accordingly, it is desirable to provide apparatus for detecting the location of electron stream interception in an electron stream device.

Therefore it is another object of this invention to provide apparatus for detecting the point of interception of a stream of charged particles by the electrodes of a device directing a stream of charged particles along a particular path.

Another object of this invention is to provide apparatus for detecting the presence of a stream of atomic-sized or sub-atomic particles within an evacuated structure.

The above objectives are achieved, according to one embodiment of the invention, by providing a detector of elastic waves movable along the exterior of the vacuum envelope. The elastic wave detector is elastically coupled to the vacuum envelope adjacent to the location wherein it is desired to determine whether an electron stream is being intercepted. The electron stream, upon being intercepted, induces elastic waves in the interception member. The elastic waves are transmitted through the member and the vacuum envelope to the elastic wave detector.

The invention will be described with reference to the accompanying drawings wherein:

FIGURE 4 is an elevational view, partly in cross-section, of the elastic wave detector of FIGS. 1 and 2;

FIGURE 5 is an elevational view, in cross-section, of another embodiment of the invention;

FIGURE 6 is a end view, in cross-section, of the embodiment of FIG. 5; and

FIGURE 7 is an elevational view, partly in cross-section, of another embodiment of the invention.

Figure 1:
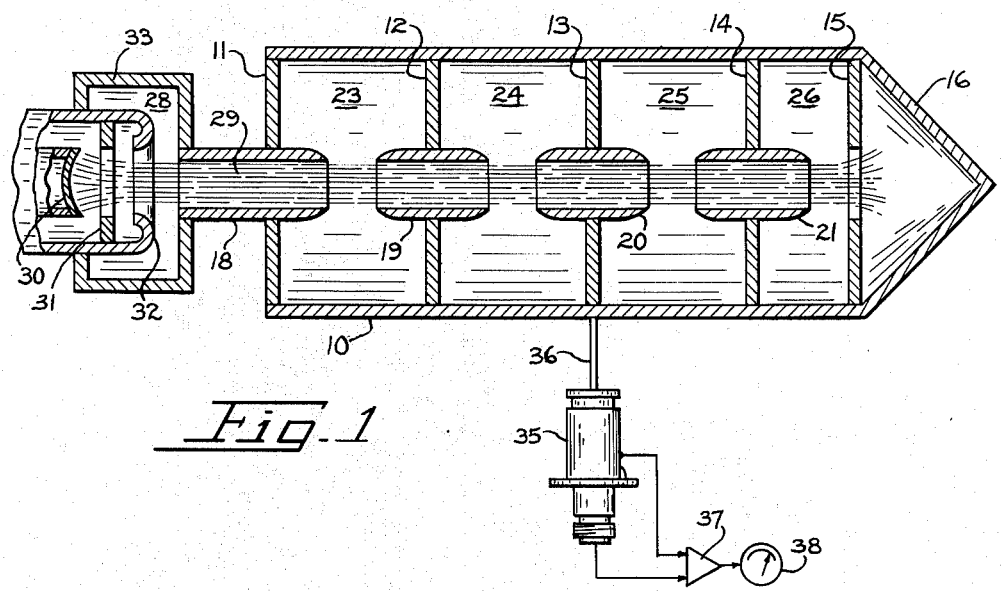
FIGURE 1 is an elevational view, partly in cross-section, of one embodiment of the invention.

In the embodiment of FIG. 1 a klystron is shown as the exemplary structure embodying the invention. The klystron illustrated is rotationally symmetrical about the longitudinal axis thereof, such axis being an imaginary horizontal straight line and passing through the center of the figure. The klystron comprises a hollow metallic cylinder 10 having disposed therein a plurality of centrally apertured metallic wall discs 11, 12, 13, 14, and 15. The outer cylindrical surface of each of discs 11–15 is affixed, as by soldering, to the opposed internal cylindrical surface of cylinder 10. Cylinder 10 and wall discs 11–15 may be composed of, for example, copper. A metallic electron collector 16, conical in shape, is affixed to one end of cylinder 10.

Drift tube cylinders 18, 19, 20, and 21 are disposed in the central apertures of the respective ones of discs 11, 12, 13, and 14. Cylinders 18–21 may be composed of a metal such as copper. The outer cylindrical surface of each of cylinders 18 to 21 is soldered, or otherwise permanently affixed, to the internal cylindrical surfaces of the respective ones of discs 11–14. A plurality of reentrant cavity resonators 23, 24, 25, and 26 are defined by the enclosing cylinder 10, wall discs 11–15, and drift tube cylinders 18–21. For example, cavity resonator 23 is formed by a portion of the inner surface of cylinder 10, one face of each of discs 11 and 12, and the outer cylindrical surfaces of portions of cylinders 18 and 19.

An electron gun 28 is disposed opposite one end of the klystron for projecting an electron stream 29, shown pictorially, along the axis of the klystron. Electron stream 29 travels in succession through the central apertures of cylinders 18, 19, 20, and 21 and through the aperture in disc 15, and is received by the interior surfaces of collector 16. A magnetic field, not shown, may be directed along the length of travel of the electron stream to provide for focusing thereof. The magnetic field may be provided by an external solenoid, for example, surrounding all or portions of the klystron.

Electron gun 28, one type of electron gun suitable for use with the invention, comprises an indirectly heated cathode 30 and a cathode heater, not shown, mounted immediately behind cathode 30. The cathode heater is connected to a suitable energizing source for heating cathode 30 to a suitable temperature for emitting electrons. A centrally apertured focusing electrode 31 and a corresponding apertured accelerating anode 32 are provided for projecting electrons emitted by cathode 30 along the axis of the klystron. Electrode 31 and anode 32 also function to focus the electrons into the concentrated stream 29. An electrical potential, not shown, is provided between cathode 30 and anode 32 to project the electron stream along the klystron with the proper velocity for operation. A cup-shaped member 33, supported from one end of cylinder 18, supports the cathode and anode in proper position to form and project the electron stream along the intended path.

The interior of the klystron structure illustrated is evacuated. A vacuum envelope is formed by cylinder 10, wall disc 11, collector 16, cylinder 18, cup-shaped member 33, and electron gun 28.

The incidence of the electron stream on the internal surface of collector 16 generates elastic waves in the collector, if the collector is formed of elastic material, such as copper. An elastic material is one which, when deformed by application of forces, automatically recovers its normal configuration as the deforming forces are removed. For every strain there arises in an elastic material, corresponding stress, which represents the tendency of the substance to recover its normal condition. Most metals in their solid states and other solid and liquid substances function as elastic materials.

Elastic waves are generated by the incidence of atomic-sized or sub-atomic particles on the surface of elastic materials, according to the theory of operation as presently understood, because of localized heating of the elastic material. The absorption of the energy of the particles by the surface material results in incremental temperature changes at the surface. Corresponding thermal expansions, or strains, accompany the temperature changes. Stresses are then set up as a result of the strains. If discrete bursts of the particles are provided for incidence on the surface, time-varying strains and stresses occur at the surface. These stresses and strains thereupon propagate away from the location of particle incidence as elastic waves in the elastic material.

One form of an elastic wave generated in collector 16 is the longitudinal wave, which travels from the interior surface of the collector, where it is induced by the electron stream, through the thickness of the collector to its exterior surface.

Elastic waves may also be generated elsewhere in the structure of FIG. 1 by an electron stream that is not perfectly focused, such that the stream diameter increases as the stream travels along the klystron axis. A portion of this stream will strike at least one of the drift tube cylinders and will generate elastic waves therein. The elastic waves so generated will propagate successively through the drift tube, along the radii of the respective discs supporting the drift tube, and through the thickness of cylinder 10. For example, if a portion of the electron stream is incident on the interior surface of cylinder 20, elastic waves will travel through the thickness of cylinder 20, across the radius of disc 13, and through the thickness of cylinder 10 that surrounds disc 13. If the electron stream intensity varies in time, such as by bursts or pulses, as by applying a corresponding time-varying accelerating voltage to anode 32, corresponding elastic waves will be generated in the members upon which the electron stream is incident.

The elastic waves generated in the interior of the klystron by the electron stream are detected by an elastic wave detector 35. Elastic wave detector 35 senses elastic waves by means of a probe 36, which is an elongated bar of elastic material, such as duralumin. The exposed tip of probe 36 may be placed in contact with the external surfaces of cylinder 10 or of collector 16. Elastic waves reaching the outer surfaces of cylinder 10 or collector 16 will be coupled to probe 36 and converted to corresponding electrical signals in detector 35. The electrical signals are thereupon amplified by amplifier 37. The output signals of amplifier 37 may be coupled to a meter 38 or an oscilloscope for denoting the amplitude of the elastic waves detected, or may be coupled to a utilization device for further employment.

In FIG. 1 detector 35 is shown disposed with its probe 36 in contact with cylinder 10, opposite disc 13. If electron stream 29 is incident on cylinder 20, the elastic waves generated will appear most strongly on cylinder 10 opposite the tip of probe 36 and will be measured by meter 38. Detector 35 may be fixed in position to detect the defocusing of the electron stream at a particular point along the length of the klystron axis or it may be moved about the external surface of the klystron to detect various points where electrons are incident on interior surfaces or electrodes.

The elastic wave detector need not be disposed external to the vacuum envelope. For example, an equivalent type of elastic detector may be mounted within the envelope and the electrical leads brought out from the envelope to sense the electrical signal generated by the detector. Thus, a short probe of an elastic wave detector may be rigidly affixed to the surface of disc 13 within cavity 24.

The transfer of elastic waves between the adjacent surfaces of a pair of abutting elastic members, such as the exterior surface of cylinder 10 and the tip of probe 36, may be enhanced by the employment of a thin film of light oil, such as light machine oil, between the adjacent surfaces. If the elastic detector is to be fixed in position a cement or liquid resin may be employed between the adjacent surfaces.

There has thus been disclosed in FIG. 1 an embodiment of the invention wherein a stream of particles, for example, electrons, is provided within an evacuated envelope, and wherein the incidence of the particles on an interior surface within the envelope generates elastic waves at such surface. These elastic waves are then detected by a detector of elastic waves which communicates elastically with the surface whereon the particles are incident.

Figures 2, 3:
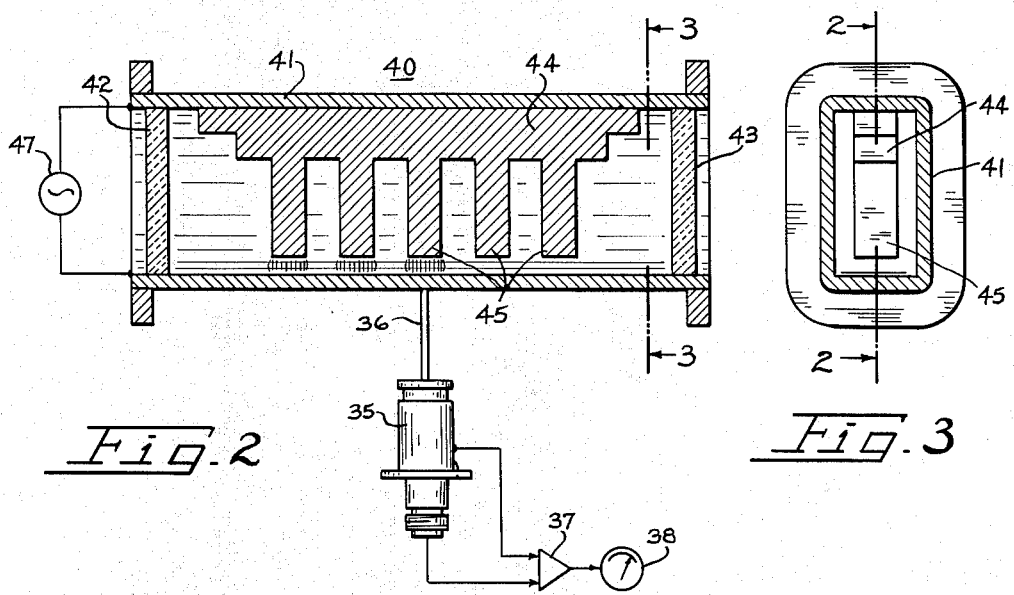
FIGURE 2 is an elevational view, partly in cross-section, of another embodiment of the invention.
FIGURE 3 is an end view, in cross-section, of the embodiment of FIG. 2.

In the embodiment of FIGS. 2 and 3, elastic waves are generated by electron discharges of the multipactor type, are transmitted through elastic members, and are received by elastic wave detectors. The multipactor discharges are generated in a cell designated generally by the reference numeral 40. Cell 40 comprises a conductively bounded waveguide section 41, of elastic material, such as copper. A pair of dielectric windows 42 and 43 are affixed and sealed to the inner surfaces of waveguide section 41. Windows 42 and 43 function as gas seals, transparent to the passage of electromagnetic energy, but impervious to the passage of gas molecules. The interior of waveguide section 41 between windows 42 and 43 is evacuated. Thus, windows 42 and 43 provide a seal to maintain a vacuum in the section of the waveguide between the two windows, while permitting passage of electromagnetic wave through such section.

A ridge member 44 is rigidly affixed to one wall of waveguide section 41. Extending from ridge 44 toward the opposite wall of section 41 are a plurality of projections 45.

The end surface of each of projections 45 and the opposing surface portion of the waveguide wall define a gap across which a multipactor discharge occurs. These opposing surfaces may be coated with a material to provide secondary electron emission ratios greater than unity for certain velocities of impacting electrons. In the gaps between such coated surfaces, and in the presence of electromagnetic waves having greater than a predetermined energy level, multipactor discharges will occur. A multipactor discharge is a sustained secondary emission discharge existing across a gap as a result of the motion of secondary electrons in synchronism with a strong, rapidly alternating (microwave) electric field applied to the gap. Details on the theory and mode of operation of such a discharge are provided in the co-pending U.S. patent application S.N. 190,450, filed April 26, 1962 by J. F. Kane and assigned to the assignee of the instant invention.

A transmitter 47 is shown symbolically as being coupled to transmit electromagnetic waves of microwave frequency into and through cell 40. Transmitter 47 may be one of several types well known in the art for generation of microwave energy, such as a klystron, a magnetron, or a traveling wave tube. Transmitter 47 may provide a continuous or a pulsed output signal. When the microwave energy applied to cell 40 by transmitter 47 is of sufficient amplitude one or more multipactor discharges will occur between respective ones of projections 45 and the opposing waveguide wall. In the particular instant of operation illustrated three such discharges are shown.

The electrons of the multipactor discharge induce elastic waves at the end surface of each one of projections 45 at which a multipactor discharge is taking place and at the corresponding opposing surface portion of the waveguide wall. These elastic waves, in one form, propagate across the thickness of the wall as longitudinal waves and reach the outer surface. The elastic waves also propagate along the length of projections 45. An elastic wave detector 35, of the type previously described, will receive these elastic waves if the probe 36 thereof is placed against the waveguide wall opposite the one of projections 45 where a multipactor discharge is occurring.

The apparatus of FIG. 2 is useful for detecting the presence of a multipactor discharge at the various projections 45 and for detecting the presence of a multipactor discharge in an undesired location. For convenience in operation transmitter 47 may be pulsed or otherwise modulated at an audio rate. If, then, amplifier 37 is connected to an electrical-to-audio transducer, such as a speaker, the locations of multipactor discharge may be audibly sensed as the probe is moved along the waveguide wall.

Again, as described in connection with FIG. 1, one form of detector 35 may be mounted within the vacuum envelope and directly in contact with a projection 45 to receive elastic waves transmitted therein.

Thus, the apparatus of FIG. 2 again illustrates the generation of elastic waves in a vacuum by particles incident on an elastic member, the transmittal of the elastic waves through the elastic member and the receipt and detection of the waves.

One form of elastic wave detector useful in the embodiments of FIGS. 1–3 is shown in FIG. 4. Elastic wave detector 35 is provided with a probe 36 for receiving the elastic waves to be sensed. Probe 36 is composed of an elastic material such as duralumin. The length of probe 36 is selected in accordance with the probe's function. To reach locations accessible with difficulty a longer probe is necessary than in other instances. Probe 36 is provided with an expanded end portion 50. A piezoelectric crystal member 51 is affixed to end portion 50.

Crystal member 51 comprises a slab of piezoelectric material such as barium titanate sandwiched between a pair of electrodes. Piezoelectric material is characterized by the two functions of: (a) providing a voltage or signal thereacross in response to the application thereto of mechanical stresses and (b) mechanically distorting or deforming when voltages are applied across the surfaces of the material. It is the first function which is employed in the detector of FIG. 4.

Crystal member 51 has silver electrodes on both flat faces thereof. The silver may be applied by painting with silver paint or by evaporation of silver thereon. The silver electrodes, themselves, if of sufficient thickness, constitute elastic members.

One electrode of crystal member 51 is bonded to end portion 50 by the employment of a conducting epoxy resin cement, or an elastically transmitting material such as phenyl salicylate. An electrical connector 52 has one end thereof affixed to the other electrode of member 51. Connector 52 may be constructed, for example, of gold, and is fastened to the crystal member electrode by soldering or by employment of a conducting epoxy resin cement. The upper portion of detector 35 comprises a coaxial transmission line having concentrically disposed outer conductor 55 and inner conductor 56. The coaxial line portion may be composed, for example, of brass. The other end of connector 52 is soldered to one end of inner conductor 56.

Inner conductor 56 is supported concentrically within outer conductor 55 by a Teflon bushing 57. A Teflon screw 58 functions to hold inner conductor 55 within bushing 57. A cylindrical brass spacer 59 is fittted within the lower end of outer conductor 55 and serves to position end portion 50. A sleeve 60 threadedly engages the inner end surface of outer conductor 55 and clamps end portion 50 between one end of sleeve 60 and spacer 59.

In the operation of the detector of FIG. 4, longitudinal elastic waves are generated in the exposed end of probe 36 and propagate toward end portion 50. The elastic waves are transmitted across the boundary between end portion 50 and crystal member 51 and induce corresponding deformations in the crystal member. By means of the piezoelectric function the deformations of member 51 are converted to corresponding voltages across the silver electrodes thereof. These voltages are transferred electrically to corresponding voltages between outer conductor 55 and inner conductor 56.

A signal delay and storage apparatus is illustrated in FIGS. 5 and 6. Such apparatus comprises a pair of rectangular waveguide sections 65 and 66 coupled together by an elastic delay line 67. A transmitter 68 is shown symbolically as being coupled to transmit electromagnetic waves of microwave frequency into the input end of waveguide section 65. Transmitter 68 provides microwave signals at various pulse widths and repetition rates, as required to represent the information to be delayed or stored in delay line 67. Thus, the signals provided by transmitter 68 may be bursts or pulses of microwave energy representing information in binary digital code. On the other hand the information provided by these signals may be in video form, such as is used in television transmission and reception.

A hollow evacuated chamber 70 is provided at one end of waveguide section 65. Chamber 70 is sealed to maintain a vacuum therein by means of an end wall 71, which is affixed to the end of waveguide section 65, and a dielectric window 72, which is sealed to the interior surfaces of waveguide section 65. A conductive post 73, of circular cross-section, is affixed to one wall of waveguide section 65 within chamber 70 and extends toward the opposite wall. The end surface of post 73 and the opposing surface portion of the opposite waveguide wall may be coated with a material to provide secondary electron emission ratios greater than unity for certain velocities of impacting electrons. Thus, when the signals delivered by transmitter 68 to chamber 70 have greater than a predetermined energy level, a multipactor discharge, of the type previously described, will occur in the gap between the end surface of post 73 and the opposing waveguide wall. For each pulse of energy so received from transmitter 68 a corresponding multipactor discharge will occur.

Delay line 67, of circular cross-section, is of length to provide the proper time delay for transmission of elastic waves therealong, such length corresponding to the mathematical product of the velocity of the elastic waves propagating therein and the time duration of the delay required. Delay line 67 is composed of an elastic material, such as duralumin or quartz. One end of delay 67 is elastically coupled to one wall of waveguide section 65, by employment of solder or an epoxy cement of the type previously described.

The other end of delay line 67 is coupled to waveguide section 66 by insertion in an aperture in a wall thereof. A conductive post 77, of circular cross-section, is affixed to the opposite wall of waveguide section 66 and extends toward the aperture in which delay line 67 is inserted. A piezoelectric crystal member 78, of the type described previously, is inserted between the opposing end surfaces of delay line 67 and post 77.

In operation, the electrons of the multipactor discharge in chamber 70 induce longitudinal elastic waves at the surface of the adjacent waveguide section wall, as described in connection with FIG. 2. These elastic waves propagate across the thickness of the waveguide wall, couple to delay line 67, and propagate therealong as longitudinal waves from left to right in the figure. When the elastic waves arrive at the boundary between the end of delay line 67 and crystal member 78 they induce corresponding deformations in the crystal member. These deformations are converted to corresponding voltages across the crystal member. The voltage variations provided across crystal member 78 launch corresponding electromagnetic waves in waveguide section 66, whereupon the electromagnetic waves propagate upwardly in the figure and are applied to a utilization apparatus, not shown. Thus, the apparatus of FIGS. 5 and 6 provides for a delay between the transmission and reception of information represented by microwave energy.

In the embodiment of FIG. 7, information carried by an electron stream is converted to elastic wave energy, the elastic waves are amplified, and an elastic wave detector provides for reception and utilization of the amplified energy. The amplification of the elastic waves takes place in a crystal member 85, which has a pair of buffers 86 and 87 affixed to opposing surfaces thereof. Crystal member 85 is composed of a piezoelectric semiconductor, such as cadmium sulfide. The buffers may comprise an elastic insulator, such as diffused silicon. Buffers 86 and 87 may be affixed to the crystal member surfaces by indium solder.

An electron stream 29 is provided by an electron gun 28 of the type described in connection with FIG. 1. Electron stream 29 is emitted by cathode 30 and is accelerated by anode 32. Information may be supplied in the electron stream by pulsing the stream, one technique being to pulse the anode potential. Electron gun 28 is held in position within cup-shaped member 33, which is, in turn, supported on one end of a cylinder 89. The other end of cylinder 89 is affixed to an end surface of buffer 86. The interior of electron gun 28 is evacuated.

In the manner heretofore described the electrons of electron stream 29 which are incident on the surface of buffer 86 generate corresponding elastic waves in the buffer. The resulting longitudinal elastic waves propagate to the right in the figure, crossing buffer 86, crystal member 85, and buffer 87. In crystal member 85 the propagating elastic waves are amplified.

The buffers function to couple the elastic waves to the crystal member. They may be made of sufficient thickness to prevent reflected wave pulses from interfering with the main elastic wave pulses or signals being amplified. The amplified elastic waves reaching the right-hand surface of buffer 87 actuate a piezoelectric crystal member 91, whereupon the elastic waves are converted into electrical signals. The electrical signals are shown symbolically to be coupled to an electrical amplifier 92, the output of which actuates a meter 93 or other utilization device.

To the extent that the theory of operation of the embodiment of FIG. 7 is presently understood, the longitudinal elastic waves propagating across the width of crystal member 85 are amplified when they move in sychronism with mobile charge carriers traveling in the same direction. These charge carriers are accelerated to the right by a voltage applied across at least a portion of the thickness of crystal member 85, such as by application to terminal 95. The quantity of the available mobile charge characters may be increased and the amplification enhanced by application of light, in the present instance of the range of 5770 to 5790 angstroms, to crystal member 95. Accordingly, in the embodiment of FIG. 7 information carried on an electron beam may be converted to elastic waves and subsequently amplified.

While the principles of the invention have been made clear in the illustrative embodiments, there will be obvious to those skilled in the art, many modifications in structure, arrangement, proportions, the elements, materials, and components, used in the practice of the invention, and otherwise, which are adapted for specific environments and operating requirements, without departing from these principles. The appended claims are therefore intended to cover and embrace any such modifications within the limits only of the true spirit and scope of the invention.

What is claimed is:

1. In combination:

an evacuated envelope, an elastic member having at least two surfaces, one of said surfaces being disposed within said envelope, the other of said surfaces being outside of said envelope, means within said envelope for directing a modulated stream of sub-atomic particles for incidence on said one surface for generating elastic waves in said member corresponding to the modulation of said stream, and a detector of said elastic waves coupled to the other one of said surfaces.

2. In combination:

an evacuated envelope, an elastic member having at least two surfaces, one of said surfaces being disposed within said envelope, the other of said surfaces being outside of said envelope, means within said envelope for directing a modulated stream of particles for incidence on said one surface for generating elastic waves in said member corresponding to the modulation of said stream, and a detector of said elastic waves coupled to the other one of said surfaces.

3. In combination:

an evacuated envelope, a rigid member having at least two surfaces and adapted to propagate elastic waves between said surfaces, one of said surfaces being disposed within said envelope, means within said envelope for directing a modulated stream of electrons for incidence on said one surface for exciting elastic waves corresponding to the modulation of said stream to propagate within said member and away from said one surface, and a detector of said elastic waves coupled to the other one of said surfaces.

4. The combination of claim 3 wherein said detector comprises means for converting said elastic waves to electrical signals.

5. Apparatus for detecting the location of electron beam interception comprising:

an envelope containing an evacuated region therein having an external surface and having an internal surface facing said region, an electron gun disposed within said envelope for projecting a modulated stream of electrons along an extended path in said region, a plurality of electrodes disposed within said region, means for supporting said electrodes within said envelope, said means elastically coupling said electrodes to said internal surface of said envelope, and a detector of elastic waves responsive to elastic waves corresponding to the modulation of said stream coupled to said external surface of said envelope for detecting elastic waves generated by the incidence of electrons of said stream on said electrodes.

6. Apparatus for detecting the location of electron beam interception comprising:

an evacuated envelope, an electron gun disposed in said envelope for projecting a modulated stream of electrons along an extended path within said envelope, a plurality of electrodes disposed within said envelope and proximate to said path, a rigid structure having a surface coupled to one of said electrodes and adapted to propagate elastic waves corresponding to the modulation of said stream generated in said one electrode by the incidence of electrons of said stream on said one electrode, and a detector of elastic waves coupled to another surface of said structure.

7. Apparatus for detecting the location of electron stream interception comprising:

an evacuated envelope having an exterior and an interior surface, the interior surface facing an evacuated region within said envelope, an electron gun disposed within said envelope for projecting a modulated stream of electrons along an extended path within said region, a plurality of electrodes disposed within said region proximate to said path and affixed to said interior surface, and a detector of elastic waves coupled to said exterior surface for sensing elastic waves corresponding to the modulation of said stream generated by the incidence of electrons of said stream on one of said electrodes.

8. Apparatus for detecting the presence of a charged particle discharge comprising:

an evacuated envelope, means for generating a multipactor discharge within said envelope whereby elastic waves corresponding to the oscillatory motion of the electrons of said multipactor discharge are generated in said envelope, and a detector adapted to sense said elastic waves coupled to said envelope.

9. Apparatus for detecting the presence of a charged particle discharge comprising:

an evacuated envelope, a pair of opposed spaced conductive members within said envelope, each of the opposed surfaces of said members comprising a material characterized by a secondary-emission ratio greater than unity for a predetermined energy level of electromagnetic energy in the region between said opposed surfaces, means for maintaining the region between said opposed surfaces substantially evacuated, means for transmitting electromagnetic energy having said predetermined level to said region, said electromagnetic energy providing a secondary-emission discharge between said surfaces as a result of the motion of secondary electrons produced at said surfaces in synchronism with the alternating field of said electromagnetic energy whereby elastic waves corresponding to said motion of said electrons are generated in said member, and a detector of said elastic waves coupled to one of said conductive members.

10. Apparatus for detecting the presence of a multipactor discharge comprising:

an evacuated envelope, a pair of opposed spaced members within said envelope adapted to sustain a multipactor discharge therebetween in response to electromagnetic energy of predetermined energy level and frequency applied therebetween, and a detector of elastic waves elastically coupled to at least one of said members for sensing elastic waves induced therein by the oscillatory impact of the electrons of said multipactor upon said member.

11. Apparatus for providing a predetermined delay of signals comprising:

an evacuated envelope, means for generating a multipactor discharge within said envelope, an elongated elastic delay member coupled at one end thereof to said discharge whereby elastic waves corresponding to the oscillatory motion of the electrons of said discharge are generated therein, the length of said delay member corresponding to said predetermined delay, and means coupled to the other end of said delay member for converting said elastic waves transmitted by said delay member to corresponding electrical signals.

12. A delay device comprising:

first and second hollow waveguide sections, means for maintaining a region of said first waveguide section substantially evacuated, a pair of opposed surfaces in said region for providing a multipactor discharge therebetween when electromagnetic energy greater than a predetermined level is supplied to said region whereby elastic waves corresponding to the oscillatory motion of the electrons of said discharge are generated in a wall of said first waveguide section, an elongated elastic member having one end thereof elastically coupled to said wall of first waveguide section for transmitting said elastic waves therealong, the other end of said elastic member terminating at said second waveguide section, and a converter disposed in second waveguide section and elastically coupled to said other end of the elongated member for converting said elastic waves arriving at said other end to corresponding electromagnetic waves in said second waveguide section.

13. The device of claim 12 further including means for transmitting to said region electromagnetic waves having energy greater than said predetermined level.

14. An elastic wave amplifier comprising:

a piezoelectric semiconductor member, means for providing a modulated stream of charged particles, means for directing said stream of charged particles to be incident on said member for inducing elastic waves corresponding to the modulation of said stream for propagation in said semiconductor member, and means coupled to said semiconductor member to detect said elastic waves therein.

15. An elastic wave amplifier comprising:
a piezoelectric semiconductor member having a pair of surfaces,
an evacuated envelope, one of said surfaces of said semiconductor member being within said envelope,
means disposed within said envelope for directing a modulated stream of electrons for incidence on said one surface for inducing elastic waves corresponding to the modulation of said stream in said member, and
a detector of said elastic waves coupled to the other one of said surfaces of said member.

16. The amplifier of claim 15 further including means for applying a voltage across at least a portion of said semiconductor member.

References Cited by the Examiner

UNITED STATES PATENTS

| | | | |
|---|---|---|---|
| 1,565,151 | 12/1925 | Houskeeper | 328—11 X |
| 1,962,609 | 6/1934 | Micolson | 331—155 X |
| 2,307,438 | 1/1943 | Whitaker | 315—55 X |
| 2,449,166 | 9/1948 | Hershberger | 73—24 |
| 2,508,098 | 5/1950 | Chilowsky | 328—255 |
| 2,674,694 | 4/1954 | Baker. | |
| 3,012,204 | 12/1961 | Dransfeld | 330—4.6 |

OTHER REFERENCES

Bommel et al.: (Physical Review Letter) Oct. 1, 1958; pages 234–236.

HERMAN KARL SAALBACH, *Primary Examiner.*

ARTHUR GAUSS, *Examiner.*

S. CHATMON, JR., *Assistant Examiner.*